(12) United States Patent
Lee

(10) Patent No.: US 10,425,365 B2
(45) Date of Patent: Sep. 24, 2019

(54) SYSTEM AND METHOD FOR RELAYING MESSAGES

(71) Applicant: AT&T Intellectual Property I, L.P., Atlanta, GA (US)

(72) Inventor: Tum J. Lee, Oakhurst, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 222 days.

(21) Appl. No.: 14/087,868

(22) Filed: Nov. 22, 2013

(65) Prior Publication Data
US 2015/0149560 A1 May 28, 2015

(51) Int. Cl.
*G06F 15/16* (2006.01)
*H04L 12/58* (2006.01)

(52) U.S. Cl.
CPC ................................ *H04L 51/066* (2013.01)

(58) Field of Classification Search
CPC ................ H04M 1/72552; H04W 4/02; G06Q 30/0271; G10L 15/26
See application file for complete search history.

(56) References Cited

U.S. PATENT DOCUMENTS

| 5,884,246 | A | 3/1999 | Boucher et al. |
| 6,480,885 | B1 | 11/2002 | Olivier |
| 6,816,884 | B1 | 11/2004 | Summers |
| 6,981,023 | B1 | 12/2005 | Hamilton et al. |
| 7,209,950 | B2 * | 4/2007 | Bennett ............... H04W 88/184 455/414.4 |
| 7,272,406 | B2 | 9/2007 | Chava et al. |

(Continued)

FOREIGN PATENT DOCUMENTS

| CA | 2707575 | 12/2008 |
| JP | 2006244090 | 9/2006 |

(Continued)

OTHER PUBLICATIONS

Samanta, S.K. et al., "Automatic language translation for mobile SMS," International Journal of Information Communication Technologies and Human Development (IJICTHD) 2.1, 2010, pp. 43-58.

(Continued)

*Primary Examiner* — Umar Cheema
*Assistant Examiner* — Tesfu N Mekonen

(57) ABSTRACT

Disclosed herein are systems, methods, and computer-readable storage devices for message delivery according to a distribution list, from the point of view of a message relay server. An example message relay server receives a message, and parses the message to extract a distribution list identifier. The message relay server can parse the distribution list identifier from one of a body of the message, a message subject, an address to which the message is directed, for example. Based on the distribution list identifier, the message relay server can retrieve a distribution list of intended recipients for the message and the message relay server can adapt the message for each intended recipient on the distribution list based on respective message preferences, to yield adapted messages. The message relay server can deliver each of the adapted messages to a respective recipient in the distribution list of intended recipients based on respective message preferences.

18 Claims, 4 Drawing Sheets

(56) References Cited

U.S. PATENT DOCUMENTS

| | | |
|---|---|---|
| 7,409,333 B2 | 8/2008 | Wilkinson et al. |
| 7,548,846 B1* | 6/2009 | Monster .......................... 704/8 |
| 7,865,562 B2* | 1/2011 | Nesbitt .................. G06F 17/24 709/206 |
| 7,949,944 B2 | 5/2011 | Cottrille et al. |
| 8,140,980 B2 | 3/2012 | Gunasekar et al. |
| 8,166,119 B2* | 4/2012 | Ligh .................. G06F 3/04886 709/206 |
| 8,312,086 B2 | 11/2012 | Velusamy et al. |
| 8,386,233 B2 | 2/2013 | Khuda |
| 8,406,385 B2 | 3/2013 | Woodring |
| 8,442,496 B2 | 5/2013 | Sigmund et al. |
| 8,478,579 B2 | 7/2013 | Chin et al. |
| 8,533,228 B2 | 9/2013 | Rinard et al. |
| 2007/0041370 A1* | 2/2007 | Cleveland .................... 370/352 |
| 2008/0025307 A1* | 1/2008 | Preiss et al. ................. 370/392 |
| 2010/0159891 A1 | 6/2010 | Sigmund et al. |
| 2010/0250693 A1* | 9/2010 | Zheng et al. ................ 709/206 |
| 2011/0287748 A1 | 11/2011 | Angel et al. |
| 2012/0191716 A1 | 7/2012 | Omoigui |
| 2012/0195325 A1* | 8/2012 | Connelly et al. ............. 370/432 |
| 2013/0006602 A1 | 1/2013 | Zhu et al. |
| 2013/0316746 A1* | 11/2013 | Miller et al. ................. 455/466 |
| 2014/0379814 A1* | 12/2014 | Graff et al. .................. 709/206 |

FOREIGN PATENT DOCUMENTS

| | | |
|---|---|---|
| JP | 2008059247 | 3/2008 |
| WO | WO 9745991 | 12/1997 |

OTHER PUBLICATIONS

Wams, Jan-Mark S. and Maarten van Steen, "A Flexible Middleware Layer for User-to-User Messaging," Distributed Applications and Interoperable Systems, 2003, pp. 297-309.

Schmandt, Chris and Stefan Marti, "Active messenger: E-mail filtering and delivery in a heterogeneous network," Human-Computer Interaction 20.1, 2005, pp. 163-194.

Counts, Scott, "Group-based mobile messaging in support of the social side of leisure," Computer Supported Cooperative Work (CSCW) 16, 1-2, 2007, pp. 75-97.

Heyer, Clint, Margot Brereton, and Stephen Viller, "Cross-channel mobile social software: an empirical study," Proceedings of the ACM SIGCHI Conference on Computer Human Interaction, Florence, Italy, Apr. 2008.

* cited by examiner

SYSTEM AND METHOD FOR RELAYING MESSAGES

BACKGROUND

1. Technical Field

The present disclosure relates to messaging and more specifically to relaying messages with voice and/or language translation services.

2. Introduction

The number of users of communications devices, such as smart phones, is increasing rapidly, and is including an ever more diverse population of users. For example, users can include young children, non-English speaking immigrants or international users, elderly users, and visually or physically disabled users. In fact, the 2000 United States census showed more than 8% of the population 5 years or older did not speak English very well. This population base has been increasing over the last 2 decades. In addition, a 2008 study showed 14% of the population of the United States 16 and older had trouble with basic reading and writing. Many modern communications services are based on and assume at least basic English reading and writing skills. Thus, these services are difficult, inconvenient, or impossible for an increasing number of users.

DETAILED DESCRIPTION

Disclosed herein are approaches to integrate both written and voice communication and language translation together to expand availability of communication services to a wider user base of users, including those who cannot use written English efficiently. This approach allows users to bridge language differences as well as communication medium differences. For example, text messages and e-mail are primarily written communications, and these two communication domains normally do not cross over, other than for a user manually forwarding received text to an e-mail, or copying the e-mail message for sending as a text message. The approach described herein is under the control of the sender who identifies the sending mechanism via text, e-mail, voice, or any combination of these. The sender selects a language and/or communication medium translation as part of sending the message. Thus the sent message should be appropriate for the receiving person according to the understanding of the sender.

Figure 1:
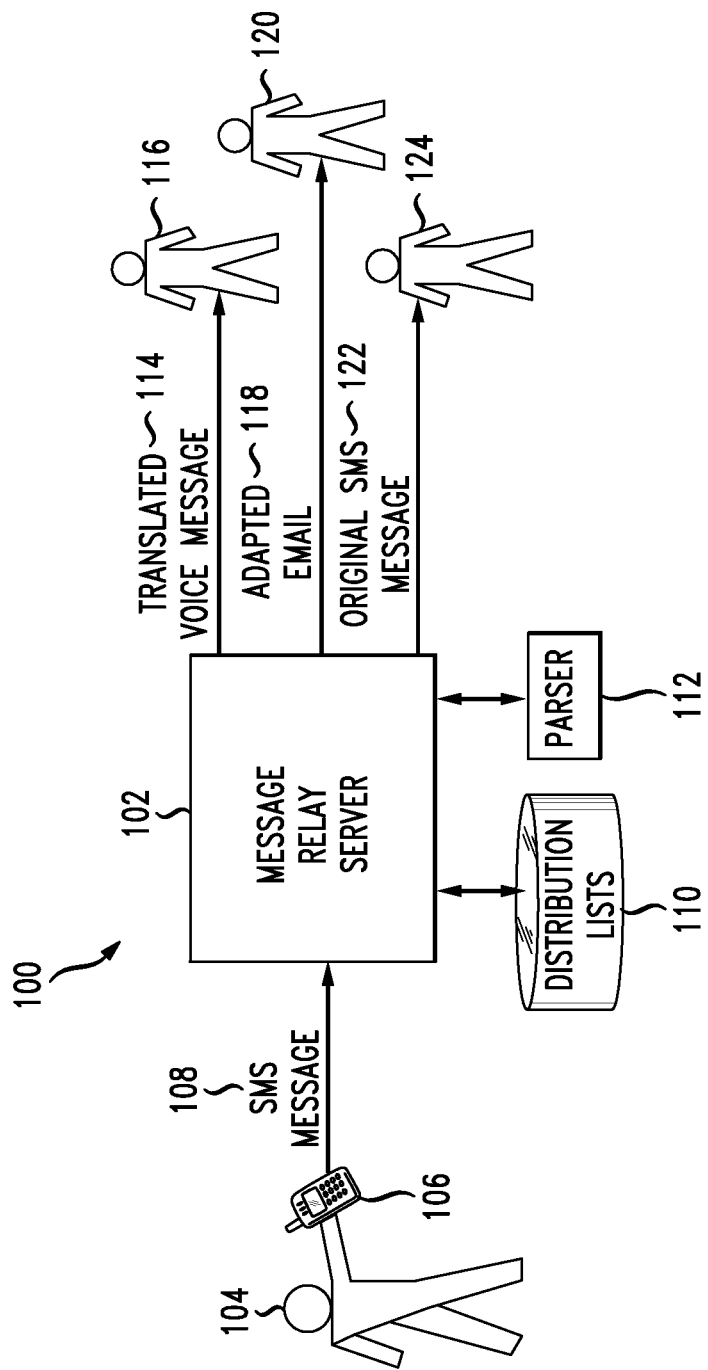
FIG. 1 illustrates an example architecture for relaying messages.
Figure 2:
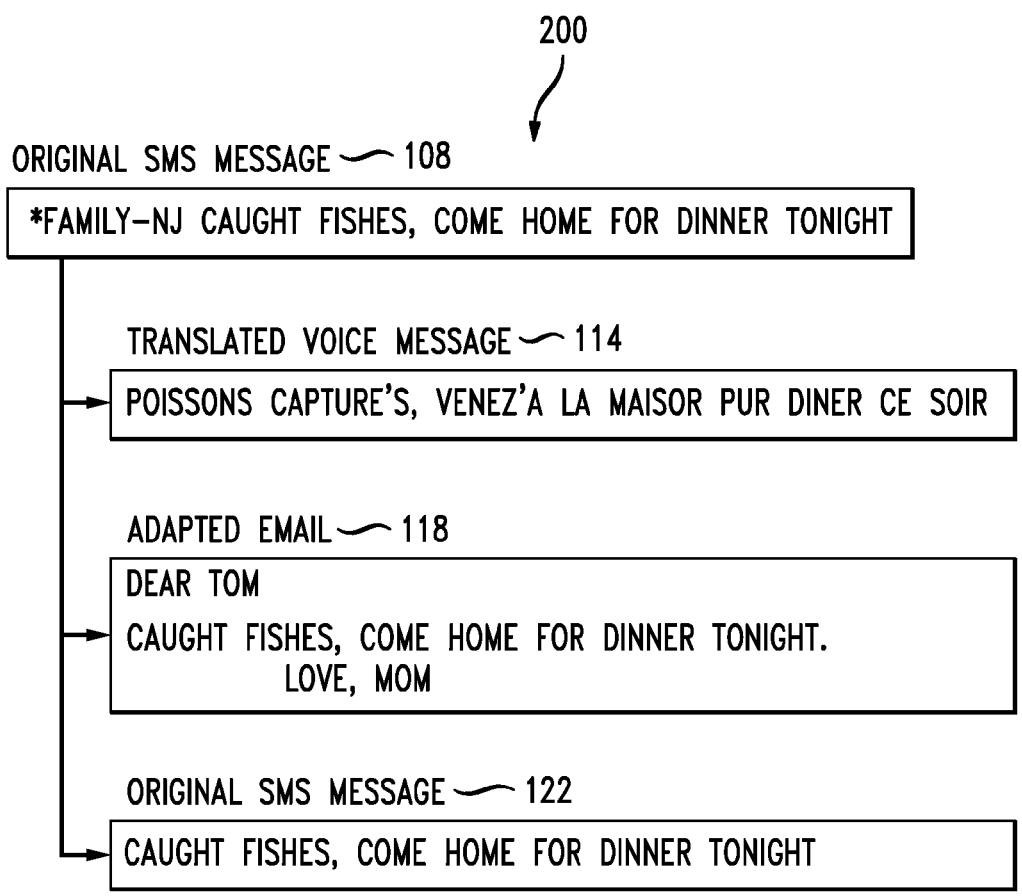
FIG. 2 illustrates an example message and various relayed messages.

FIG. 1 illustrates more detail regarding an example architecture 100 for relaying messages via a message relay server 102 according to this approach. A user 104 communicates with the message relay server 102 via a device 106, such as by sending an SMS message 108 to the message relay server 102 with a specially formed or selected portion of the message that indicates a distribution list. The message relay server 102 can identify the distribution list, from a database of existing distribution lists 110, by a specific keyword, phrase, or command embedded in the message 108. A parser 112 can parse the message 108 to identify the keyword, phrase, or command. FIG. 2 below provides an example message with an embedded keyword identifying a distribution list. In addition to an SMS message, the user 104 can send an e-mail to the message relay server using the same architecture whereby the message relay server performs similar functions on the message to extract a distribution list using a keyword. The user 104 can send any kind of message or communication in place of the SMS message 108, as long as the message relay server 102 is able to extract out a keyword, command, or other instructions from the message. While the examples provided and discussed herein are primarily directed to extracting the keywords or other distribution list identifiers out of the message itself, the system can also receive such keywords as a separate piece of data, such as a setting or instruction generated and sent as a data packet either before, after, or simultaneously with the message.

The message relay server 102 identifies recipients in the distribution list, and identifies the respective messaging and language preferences for each recipient. Then the message relay server 102 can translate or adapt the message accordingly for transmission to the recipients. The message relay server 102 can identify, for example three recipients 116, 120, 124 based on the distribution list indicated in the message 108 by the user 104. The message relay server 102 can then translate the SMS message 108 to a voice message 114 for first recipient 116 based on the recipient language and communication preferences. The message relay server 102 can translate the SMS message 108 to an email 118 for a second recipient 120 based on the recipient language and communication preferences, sending the e-mail using either the subscriber's personal e-mail address or the subscriber's relay server e-mail address as based on the subscriber's account setting. The message relay server 102 can avoid translating the SMS message 108 at all for third recipient 124 based on the recipient language and communication preferences, and essentially forward the SMS message 122 to the third recipient in its original form, including the subscriber's personal SMS number. Thus in one embodiment, from the recipients' 116, 120, 124 point of view, the message is received directly from user 104.

The recipients 116, 120, 124 can view the original written message in the original language for clearing up any confusion. This can be useful because the machine translation of the message 108 may not be perfect, and may introduce confusion or ambiguity. For example, the message relay server 102 can append the original message text at the end, insert a link in the end of the message, or provide some other mechanism for recipients 116, 120, 124 to access the original message, or as close to the original message as is possible via the communication abilities available to a given recipient. For example, the first recipient 116 hears the translated voice message in the recipient's language, but may not have the ability to receive text messages. In this situation, the message relay server 102 can provide a text-to-speech version of the original SMS message 108 instead of providing the actual text of the message 108, and the relay server can append a voice reading of a web link and associated credentials for recipient 116 or the recipient's assistant to view the original text message in a browser. A recipient of a message does not need to invoke or launch any additional application or copy and paste text into any additional application to do the translation since the message relay server 102 performs the translation in advance. This simplifies the user experience from the perspective of the recipient, in either written form or spoken form. The message relay server 102 can enable a sender 104 to 'broadcast' a message 108 to group of recipients 116, 120, 124 using text, e-mail, or a voice phone call, for example, and translate the resulting messages 114, 118, 122 in each recipient's respective language and preferred messaging format.

FIG. 2 illustrates an example 200 of the original SMS message 108 and various relayed messages 114, 118, 122. The original SMS message 108 can be "*FAMILY-NJ Caught fishes, come home for dinner tonight." In this case, the keyword, command, instruction, or distribution list identifier is "*FAMILY-NJ." The sender 104 or some other user can establish this keyword as identifying a distribution list, and the corresponding users to be included in the distribution list, such as via a web interface, a smartphone app, text messages, or some other interface with the message relay server 102 and the database of distribution lists 110. The distribution list and keyword can be specific to one user, or can be used for a group of users. For example, the sender 104 can establish the keyword *FAMILY-NJ with the three recipients for his use exclusively, or for his use plus the use of any of the members on the distribution list to communicate with each other as a group. The sender 104 can establish a publicly usable keyword that any other user can use to communicate to the recipients. In another variation, the same distribution list may have multiple sender-specific keywords. So one sender identifies the distribution list via one keyword, while another sender identifies the same distribution list via a different keyword. Alternatively, multiple users may use the same keyword, but the message relay server 102 can identify the keyword with different distribution lists for each sender. For example, two separate users may use the same keyword *SMITH-FAMILY, but correspond to different distribution lists in the database of distribution lists 110 on a per-sender basis.

The message relay server 102 can translate the original message 108 into a different language, and apply a text-to-speech service to generate the translated voice message 114. As part of that process, the message relay server 102 can optionally strip out the keyword, as shown in FIG. 2. The message relay server 102 can perform additional message processing. For example, the message relay server 102 can add formatting, structuring, or additional details specific to the type of the communication to send. For example, in the adapted email 118, the message relay server 102 can include additional text to make the message more like an actual email. In this example, the message relay server 102 included "Dear Tom" and "Love, Mom" around the text of the original message 108. While these extra words are considered unnecessary in a SMS message, they are more customary in an email message. The message relay server 102 can automatically add in these words based on inferences of relationship between the sender and the recipient and the type of the message. Alternatively, the sender 104 can establish these settings with the message relay server 102 on a per-recipient and/or per-message type basis. The message relay server 102 can also work in the other direction, by removing unnecessary parts of an original message. If the original message is an email that is being converted to a SMS message, the message relay server 102 can remove the "Dear recipient" and "Love, Sender" lines or their equivalents. The message relay server 102 can simply forward the original e-mail message 108 as e-mail to the recipient when the language preferences indicate no change, and the messaging preferences indicate no change. However, the message relay server 102 can still strip out the keyword when forwarding the original e-mail message 122 as a SMS message to another recipient.

The message relay server 102 can be available to subscribers to send messages on an on-demand basis to anyone, or to predefined distribution list. A subscriber can sign up, via a web application or an app on a smartphone for example, to activate service, set up a personal profile, and create and manage distribution lists. The subscriber can specify a delivery method for each member of a distribution list, such as text, e-mail, or voice. Alternatively, recipients can set up their own delivery preferences. When these conflict, the message relay server 102 can select one delivery preference to take precedence over the other, such as always following the recipient's preferences should a conflict exists. Language translation in a particular language can be enabled for a member for a written message or a voice phone call. The subscriber can set up preferences to append an original text or a voice message if language translation is enabled, and an option for relay service to add a link and credential in a voice call for the recipient to view the original message if needed in a browser. The message relay server 102 can provide read receipt service to the sender for both text and e-mail or other messages. A subscriber can specify addresses or telephone numbers for the various communication protocols, such as an email address, a telephone number, video conferencing ID, and so forth.

The message relay server 102 can provide the subscriber with both a subscriber's relay text number and a subscriber's relay e-mail address. Then the subscriber sends the original message 108 to the relay server text number, such as central number serving all subscribers (an example of which may be 822-288-0000), or the subscriber can send an e-mail with a distribution list in the To: field of relay e-mail domain name, such as relay.com. The message relay server 102 can identify the subscriber account based on the "From" field of the text or e-mail message. When the subscriber sends a text message to the message relay server 102 via a relay server text number, or sends an email to a relay e-mail address, such as family@relay.com, the message relay server 102 can identify the subscriber based on the address or number from which the message was sent.

A sender can include or embed additional parameters or commands in the message, which the parser 112, can extract from the message. The format of the additional parameters or commands can vary, but the examples shown here are based on a leading asterisk immediately preceding a command. For example, *7325552013 identifies text to a single cellphone number, *family can identify a distribution list, *bill@email.com identifies an e-mail to a single e-mail address, *French identifies French translation, *voice identifies a voice phone call using text-to-speech technology, *time identifies a scheduled delivery time, and so forth. In some cases, the command can include additional parameters, such as "*time 9:00 am" to send the message at 9:00 am, or "*time 45 minutes" to send the message in 45 minutes. A subscriber can set up the message relay server 102 to handle incoming messages, including responses to relayed messages, sent to the subscriber's relay text number or subscriber's relay e-mail address. A subscriber can set up the relay service to store incoming messages or automatically forward messages to the subscriber's personal text number or personal e-mail address.

The message relay server 102 can provide additional services via the commands, such as *receipt_mail where the message relay server 102 adds a link to a small image file on the server to the html e-mail to track whether and when the message was opened, *receipt_SMS where message relay server 102 adds a SMS Read Receipt Required notification, *receipt_voice where the message relay server 102 identifies when a voice call was delivered successfully, and *tabulate for summarizing responses to the subscriber's message from multiple message recipients. Further, the command can include *identify for a group response in a different group to identify responders in each group, and *end_JUL05 for tabulating all responses by the end of July 5 and sending a summary message to the subscriber who had sent the original message.

The message relay server 102 typically relays messages as directed by the sender 104, but can also be directed based on other factors, such as recipient preferences, and so forth. The sender 104 can provide instructions for how to send messages as part of establishing the distribution list. For example, the sender 104 can set up a distribution list with recipients as well as recipient preferences, such as language or delivery method. The distribution list can include multiple addresses for a single recipient, so the recipient can receive different versions of the same message 108. For example, the recipient can receive an English SMS and a Spanish e-mail of the same message 108 from the sender 104.

Figure 3:
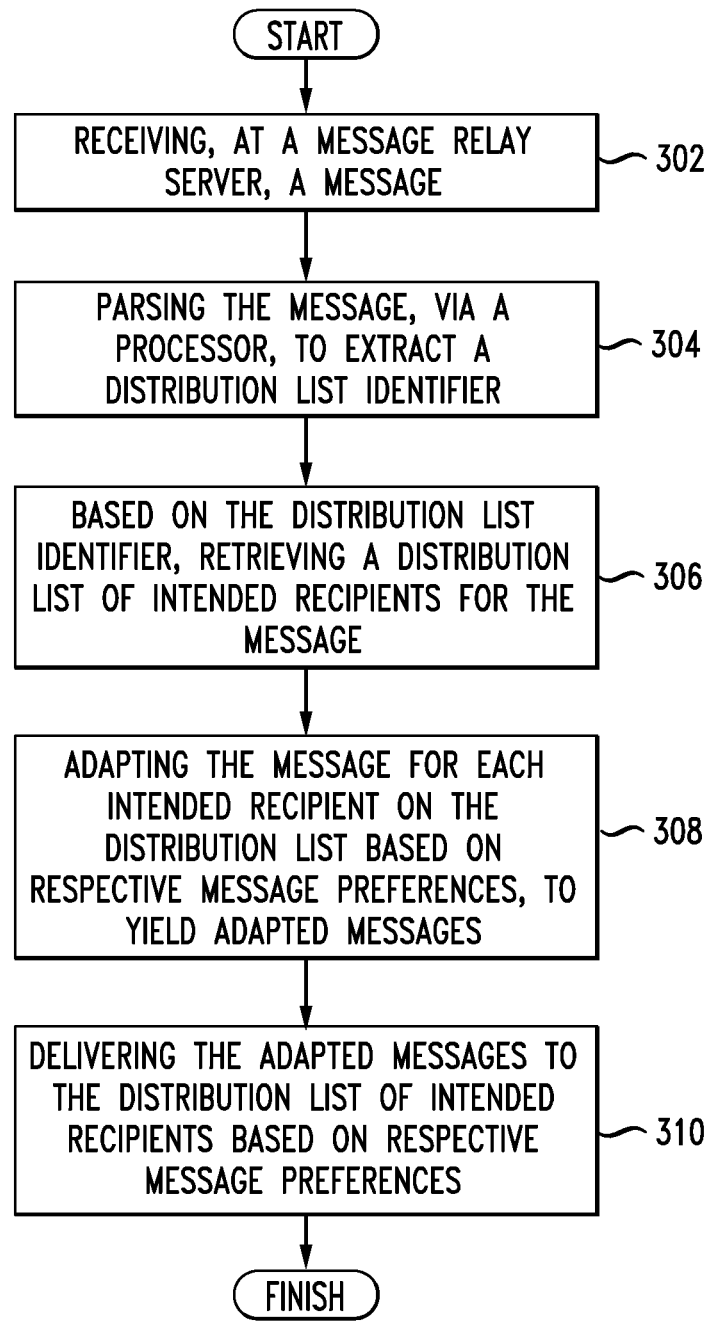
FIG. 3 illustrates an example method embodiment for relaying messages.
Figure 4:
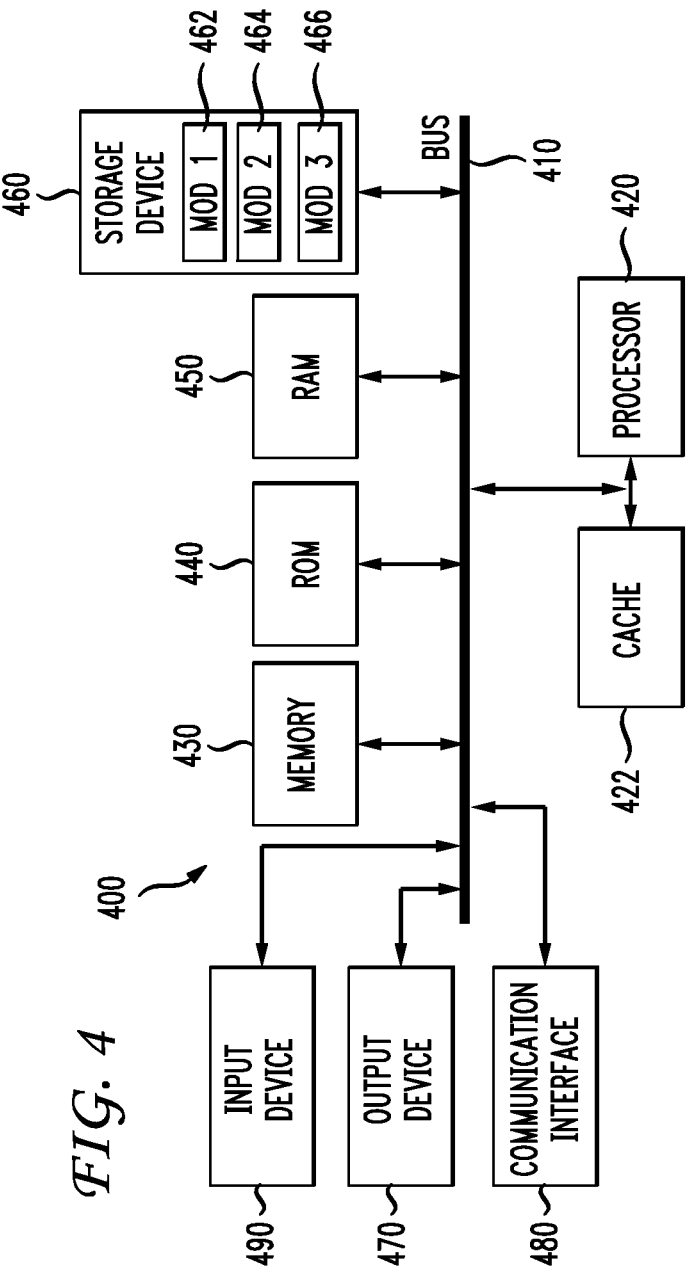
FIG. 4 illustrates an example system embodiment.

Having disclosed some basic system components and concepts, the disclosure now turns to the exemplary method embodiment shown in FIG. 3. For the sake of clarity, the method is described in terms of an exemplary system 400 as shown in FIG. 4 configured to practice the method. The steps outlined herein are exemplary and can be implemented in any combination thereof, including combinations that exclude, add, or modify certain steps.

FIG. 3 illustrates an example method embodiment for message delivery according to a distribution list, from the point of view of a message relay server. The example message relay server receives a message (302), and parses the message to extract a distribution list identifier (304). The message relay server can parse the distribution list identifier from one of a body of the message, a message subject, an address to which the message is directed, or any other information associated with the message. The user can enter the distribution list identifier as text that is part of the message, or can select the distribution list from a menu in a user interface, and a client device can communicate the distribution list identifier to the message relay server. The distribution list identifier can include a control character and a keyword. For example, the control character can be an asterisk, but could also be an octothorpe or an 'at' symbol (@). The keyword can be system-defined or user-defined. For example, the user can establish the distribution list identifier of "CollegeFriends," so when the user enters the text "*CollegeFriends" in a message, the message relay server can parse that identifier out of the message. Further, the distribution list identifier can include a parameter associated with the keyword to provide additional instructions or clarifications to how the message relay server should handle the distribution list identifier. For example, an escape character, such as \, can be used to denote the next character is not a control character, e.g. relay server will treat \* as a single text character *. The system can treat two consecutive escape characters, such as \\, as a single text character of the escape character \.

The message relay server can parse the message to extract sender commands other than the distribution list identifier, and execute the sender commands prior to or as part of delivering the adapted messages. The other sender commands can be formatted in a similar manner to the distribution list identifier, such as both starting with an asterisk, for example. In one example, the user manually enters the sender commands, but they can be automatically inserted by a client messaging application.

Based on the distribution list identifier, the message relay server can retrieve a distribution list of intended recipients for the message (306) and the message relay server can adapt the message for each intended recipient on the distribution list based on respective message preferences, to yield adapted messages (308). The message relay server can deliver each of the adapted messages to a respective recipient in the distribution list of intended recipients based on respective message preferences (310). When the respective message preferences include a language preference, the message relay server can further translate the message according to the language preference, such as translating the message from English to Spanish. When the respective message preferences include a message modality preference, the message relay server can deliver the adapted messages according to the message modality preference, such as delivering an SMS message via instant messaging or e-mail.

The message relay server can provide a user interface for a sender of the message to manage distribution list identifiers and corresponding distribution lists of intended recipients. For example, the user can change or assign distribution list identifiers with specific distribution lists, as well as modify which users are authorized or approved to use the distribution list. The sender can also manage membership in distribution lists via the user interface, such as including or excluding recipients in a distribution list, or copying, deleting, or otherwise editing a distribution list. The sender can set message modality preferences for recipients, in case the recipients have not yet established personal preferences for how to receive relayed messages.

The message relay server can receive from one of the intended recipients a reply to one of the adapted messages, and adapt the reply according to message preferences of a sender of the message to yield an adapted reply. Then the message relay server can deliver the adapted reply to the sender of the message. In this way, the message relay server can facilitate back and forth communications between distribution list members automatically based only on the initial message and distribution list identifier.

The message relay server can track receipt statistics of the adapted messages, and report the receipt statistics to a sender of the message. Receipt statistics can include multiple aspects, such as whether the message was opened, whether the message was viewed, how many times the message was viewed, whether the recipient opened or viewed the original message, what language or communication modality a reply, if any, was composed in, and so forth.

The message relay server can identify in the message a request requiring a response, such as a survey or a poll. Then, when delivering the adapted messages to the distribution list of intended recipients, the message relay server can prompt the intended recipients to provide responses, such as by replying or by visiting a website. The message relay server can receive and record the responses from the intended recipients, without exposing the results to the group, and can then report the responses to a sender of the message.

The system can enable the elderly, non-English users, or young children, to send and receive messages that they would not otherwise be able to send. The system can further enable more effective communications between English and non-English speaking users. For example, a primarily English-speaking user can send a text message to an immigrant parent or parent-in-law who has limited knowledge of English. Conversely, the system can enable the immigrant parent to communicate effectively with a child who does not know the parent's written native language; or enable communication between an immigrant grandparent with a grandchild who does not know the grandparent's native language.

Various embodiments of the disclosure are described in detail herein. While specific implementations are described, it should be understood that this is done for illustration purposes only. Other components and configurations may be used without parting from the spirit and scope of the disclosure. A brief description of a basic general purpose system or computing device in FIG. 4 which can be employed to practice the concepts, methods, and techniques disclosed is illustrated.

An exemplary system and/or computing device 400 includes a processing unit (CPU or processor) 420 and a system bus 410 that couples various system components including the system memory 430 such as read only memory (ROM) 440 and random access memory (RAM) 450 to the processor 420. The system 400 can include a cache of high speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 4 462, module 2 464, and module 3 466 stored in storage device 460, configured to control the processor 420 as well as a special-purpose processor where software instructions are incorporated into the processor. The processor 420 may be a self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. The system 400 can include other hardware or software modules. The storage device 460 is connected to the system bus 410 by a drive interface. The drives and the associated computer-readable storage media or devices provide nonvolatile storage of computer-readable instructions, data structures, program modules and other data for the computing device 400. In one aspect, a hardware module that performs a particular function includes the software component stored in a tangible computer-readable storage medium or device in connection with the necessary hardware components, such as the processor 420, bus 410, display 470, and so forth, to carry out a particular function. In another aspect, the system can use a processor and computer-readable storage medium or device to store instructions which, when executed by the processor, cause the processor to perform a method or other specific actions. The basic components and appropriate variations can be modified depending on the type of device, such as whether the device 400 is a small, handheld computing device, a desktop computer, or a computer server.

Although the exemplary embodiment(s) described herein employs the hard disk 460, other types of computer-readable media which can store data that are accessible by a computer, such as magnetic cassettes, flash memory cards, digital versatile disks, cartridges, random access memories (RAMs) 450, read only memory (ROM) 440, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 420. The functions these blocks represent may be provided through the use of either shared or dedicated hardware, including, but not limited to, hardware capable of executing software and hardware, such as a processor 420, that is purpose-built to operate as an equivalent to software executing on a general purpose processor. For example the functions of one or more processors presented in FIG. 4 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 440 for storing software performing the operations described below, and random access memory (RAM) 450 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 400 shown in FIG. 4 can practice all or part of the recited methods, can be a part of the recited systems, and/or can operate according to instructions in the recited tangible computer-readable storage media. Such logical operations can be implemented as modules configured to control the processor 420 to perform particular functions according to the programming of the module. For example, FIG. 4 illustrates three modules Mod1 462, Mod2 464 and Mod3 466 which are modules configured to control the processor 420. These modules may be stored on the storage device 460 and loaded into RAM 450 or memory 430 at runtime or may be stored in other computer-readable memory locations.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to produce much more accurate speech recognition in situations where speakers can be divided into audio channels, and can also be applied to generate more accurate speech analytics. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

I claim:

1. A method comprising:
   receiving, at a message relay server, a message from a client device;
   parsing the message, via a processor, to extract a distribution list identifier;
   retrieving a distribution list of intended recipients for the message, wherein the distribution list is retrieved using the distribution list identifier;
   identifying that a conflict exists between a stored delivery preference and a recipient preference for a respective recipient;
   resolving the conflict by choosing the recipient preference to yield a respective preferred format for receiving messages;
   identifying, for each intended recipient on the distribution list, the respective preferred format for receiving messages, to yield recipient specific formatting preferences, wherein the recipient specific formatting preferences comprise at least two modality formats;
   reformatting the message for each intended recipient on the distribution list according to the recipient specific formatting preferences, to yield reformatted messages;
   adapting the reformatted messages according to behavior patterns associated with respective modalities, wherein the adapting comprises:
      determining whether to delete existing content from the reformatted messages based on inferences of a relationship between a sender and each respective intended recipient and based on a respective message type, to yield a determination; and
      when the determination indicates that the existing content should be deleted, adapting the reformatted messages based on the determination by deleting the existing content from the reformatting messages to yield adapted messages;
   delivering each of the adapted messages to a respective recipient in the distribution list of intended recipients in formats according to the recipient specific formatting preferences;
   receiving, from a one of the intended recipients, a reply to one of the adapted messages in a first modality;
   formatting the reply according to message preferences of a sender of the message, to yield a formatted reply in a second modality; and
   transmitting the formatted reply to the client device.

2. The method of claim 1, wherein the respective message preferences a language preference, the method further comprising:
   translating the message according to the language preference.

3. The method of claim 1, wherein the at least two modality formats comprise an email format and an instant messaging format.

4. The method of claim 1, further comprising:
   providing a user interface for a sender of the message to manage distribution list identifiers and corresponding distribution lists of intended recipients.

5. The method of claim 1, further comprising:
providing a user interface for intended recipients to manage membership in distribution lists and message preferences.

6. The method of claim 1, wherein the distribution list identifier is parsed from one of a body of the message or an address to which the message is directed.

7. The method of claim 1, further comprising:
parsing the message to extract sender commands; and
executing the sender commands prior to delivering the adapted messages.

8. The method of claim 1, further comprising:
tracking receipt statistics of the adapted messages; and
reporting the receipt statistics to a sender of the message.

9. The method of claim 1, further comprising:
identifying, in the message, a request requiring a response;
when delivering the adapted messages to the distribution list of intended recipients, prompting intended recipients to provide responses;
receiving and recording the responses from the intended recipients; and
reporting the responses to a sender of the message.

10. The method of claim 1, wherein the distribution list identifier comprises a control character and a keyword.

11. The method of claim 10, wherein the distribution list identifier further includes a parameter associated with the keyword.

12. A system comprising:
a processor; and
a computer-readable storage medium storing instructions which, when executed by the processor, cause the processor to perform operations comprising:
receiving, at a message relay server, a message from a client device;
parsing the message to extract a distribution list identifier;
retrieving a distribution list of intended recipients for the message, wherein the distribution list is retrieved using the distribution list identifier;
identifying that a conflict exists between a stored delivery preference and a recipient preference for a respective recipient;
resolving the conflict by choosing the recipient preference to yield a respective preferred format for receiving messages;
identifying, for each intended recipient on the distribution list, the respective preferred format for receiving messages, to yield recipient specific formatting preferences, wherein the recipient specific formatting preferences comprise at least two modality formats;
reformatting the message for each intended recipient on the distribution list according to the recipient specific formatting preferences, to yield reformatted messages;
adapting the reformatted messages according to behavior patterns associated with respective modalities, wherein the adapting comprises:
determining whether to delete existing content from the reformatted messages based on inferences of a relationship between a sender and each respective intended recipient and based on a respective message type, to yield a determination; and
when the determination indicates that the existing content should be deleted, adapting the reformatted messages based on the determination by deleting the existing content from the reformatting messages to yield adapted messages;
delivering each of the adapted messages to a respective recipient in the distribution list of intended recipients in formats according to the recipient specific formatting preferences;
receiving, from a one of the intended recipients, a reply to one of the adapted messages in a first modality;
formatting the reply according to message preferences of a sender of the message, to yield a formatted reply in a second modality; and
transmitting the formatted reply to the client device.

13. The system of claim 12, wherein reformatting the message further comprises translating the message for an intended recipient on the distribution list based on a language preference of the intended recipient.

14. The system of claim 12, wherein the message is a text-based message and one of the at least two modality formats is a spoken message.

15. The system of claim 12, the computer-readable storage medium having additional instructions stored which, when executed by the processor, cause the processor to perform operations comprising:
providing a user interface for intended recipients to manage membership in distribution lists and message preferences.

16. A computer-readable storage device storing instructions which, when executed by a computing device, cause the computing device to perform operations comprising:
receiving, at a message relay server, a message from a client device;
parsing the message to extract a distribution list identifier;
retrieving a distribution list of intended recipients for the message, wherein the distribution list is retrieved using the distribution list identifier;
identifying that a conflict exists between a stored delivery preference and a recipient preference for a respective recipient;
resolving the conflict by choosing the recipient preference to yield a respective preferred format for receiving messages;
identifying, for each intended recipient on the distribution list, the respective preferred format for receiving messages, to yield recipient specific formatting preferences, wherein the recipient specific formatting preferences comprise at least two modality formats;
reformatting the message for each intended recipient on the distribution list according to the recipient specific formatting preferences, to yield reformatted messages;
adapting the reformatted messages according to behavior patterns associated with respective modalities, wherein the adapting comprises:
determining whether to delete existing content from the reformatted messages based on inferences of a relationship between a sender and each respective intended recipient and based on a respective message type, to yield a determination; and
when the determination indicates that the existing content should be deleted, adapting the reformatted messages based on the determination by deleting the existing content from the reformatting messages to yield adapted messages;
delivering each of the adapted messages to a respective recipient in the distribution list of intended recipients in formats according to the recipient specific formatting preferences;

receiving, from a one of the intended recipients, a reply to one of the adapted messages in a first modality;

formatting the reply according to message preferences of a sender of the message, to yield a formatted reply in a second modality; and transmitting the formatted reply to the client device.

17. The computer-readable storage device of claim 16, having additional instructions stored which, when executed by the computing device, cause the computing device to perform operations comprising:

parsing the message to extract a delivery time; and delivering the adapted messages according to the delivery time.

18. The computer-readable storage device of claim 16, wherein the respective message preferences are retrieved from recipient profiles.

* * * * *